US010502574B2

(12) United States Patent
Robinson et al.

(10) Patent No.: US 10,502,574 B2
(45) Date of Patent: Dec. 10, 2019

(54) DEVICES AND METHODS FOR A SENSOR PLATFORM OF A VEHICLE

(71) Applicant: Waymo LLC, Mountain View, CA (US)

(72) Inventors: Craig Robinson, Palo Alto, CA (US); John Tisdale, Berkley, CA (US); Seth LaForge, Mountain View, CA (US); Paul Karplus, Sunnyvale, CA (US)

(73) Assignee: Waymo LLC, Mountain View, CA (US)

( * ) Notice: Subject to any disclaimer, the term of this patent is extended or adjusted under 35 U.S.C. 154(b) by 183 days.

(21) Appl. No.: 15/271,140

(22) Filed: Sep. 20, 2016

(65) Prior Publication Data

US 2018/0081361 A1 Mar. 22, 2018

(51) Int. Cl.
*G01C 21/20* (2006.01)
*G01C 21/18* (2006.01)
*G01C 19/34* (2006.01)

(52) U.S. Cl.
CPC ............ *G01C 21/20* (2013.01); *G01C 19/34* (2013.01); *G01C 21/18* (2013.01)

(58) Field of Classification Search
CPC .... G05D 1/0088; G05D 1/0268; G01C 21/18; G01C 21/20; G01C 19/00; G01C 19/34
USPC ......................................................... 701/23
See application file for complete search history.

(56) References Cited

U.S. PATENT DOCUMENTS

| | | | | |
|---|---|---|---|---|
| 4,399,694 A | * | 8/1983 | Mayer ...................... | G01V 7/16 33/326 |
| 4,828,376 A | * | 5/1989 | Padera ...................... | F41G 3/22 269/75 |
| 5,922,039 A | * | 7/1999 | Welch ...................... | H01Q 1/34 280/5.507 |
| 6,292,725 B1 | * | 9/2001 | Kageyama ............. | G05D 1/027 180/169 |
| 6,535,114 B1 | | 3/2003 | Suzuki et al. | |

(Continued)

FOREIGN PATENT DOCUMENTS

WO 0102920 A1 1/2001
WO 2010048611 A1 4/2010

OTHER PUBLICATIONS

Zhbanov et al., "Scale Factor Correction of a Strapdown Angular Rate Sensor of a Fast Rotating Object," Gyroscopy and Navigation, vol. 3, No. 4, 2012, pp. 275-279.

(Continued)

*Primary Examiner* — Angelina Shudy
(74) *Attorney, Agent, or Firm* — McDonnell Boehnen Hulbert & Berghoff LLP

(57) ABSTRACT

In one example, a vehicle includes a platform and a yaw sensor mounted on the platform. The yaw sensor provides an indication of a yaw rate of rotation of the yaw sensor. The vehicle also includes an actuator that rotates the platform. The vehicle also includes a controller coupled to the yaw sensor and the actuator. The controller receives the indication of the yaw rate from the yaw sensor. The controller also causes the actuator to rotate the platform (i) along a direction of rotation opposite to a direction of the rotation of the yaw sensor and (ii) at a rate of rotation based on the yaw rate of the yaw sensor. The controller also estimates a direction of motion of the vehicle in an environment of the vehicle based on at least the rate of rotation of the platform.

20 Claims, 6 Drawing Sheets

(56) References Cited

U.S. PATENT DOCUMENTS

| | | | |
|---|---|---|---|
| 6,782,315 B2 | 8/2004 | Lu et al. | |
| 6,799,099 B2* | 9/2004 | Zeitler | G01S 5/14 340/988 |
| 7,110,870 B2 | 9/2006 | Tseng et al. | |
| 7,908,041 B2* | 3/2011 | Cheok | G01C 23/005 244/1 R |
| 7,969,558 B2* | 6/2011 | Hall | G01S 7/4813 356/5.01 |
| 8,165,806 B2 | 4/2012 | Yasan et al. | |
| 8,767,190 B2* | 7/2014 | Hall | G01S 17/89 356/3.01 |
| 8,965,691 B1* | 2/2015 | Lombrozo | G01P 3/481 701/26 |
| 9,063,549 B1* | 6/2015 | Pennecot | G05D 1/0259 |
| 9,625,582 B2* | 4/2017 | Gruver | H05K 999/99 |
| 9,671,094 B2* | 6/2017 | Ball | G01C 11/025 |
| 9,902,300 B2* | 2/2018 | Hein | B60N 2/10 |
| 9,963,106 B1* | 5/2018 | Ricci | B60R 25/2018 |
| 10,007,001 B1* | 6/2018 | LaChapelle | H01L 31/09 |
| 10,019,805 B1* | 7/2018 | Robinson | G06T 7/70 |
| 10,031,521 B1* | 7/2018 | Newman | G01C 21/3691 |
| 10,114,111 B2* | 10/2018 | Russell | G01S 7/484 |
| 10,222,475 B2* | 3/2019 | Pacala | G02B 27/0955 |
| 10,310,058 B1* | 6/2019 | Campbell | G01S 7/4817 |
| 2003/0149512 A1 | 8/2003 | Hrovat et al. | |
| 2004/0035347 A1* | 2/2004 | Grober | B60R 11/04 114/191 |
| 2005/0215269 A1* | 9/2005 | Cheok | G01S 5/0284 455/456.1 |
| 2006/0080004 A1* | 4/2006 | Cheok | G01C 15/14 701/1 |
| 2007/0050139 A1 | 3/2007 | Sidman | |
| 2007/0219720 A1* | 9/2007 | Trepagnier | B60W 30/00 701/300 |
| 2008/0027599 A1* | 1/2008 | Logan | G05D 1/0234 701/23 |
| 2009/0055033 A1 | 2/2009 | Gansler et al. | |
| 2010/0020306 A1* | 1/2010 | Hall | G01S 7/4813 356/5.01 |
| 2010/0079101 A1* | 4/2010 | Sidman | F16M 11/041 318/649 |
| 2011/0216304 A1* | 9/2011 | Hall | G01S 7/4813 356/4.01 |
| 2012/0215395 A1* | 8/2012 | Aznavorian | G05D 1/021 701/25 |
| 2012/0239224 A1* | 9/2012 | McCabe | B66F 9/063 701/2 |
| 2012/0239238 A1* | 9/2012 | Harvey | G05D 1/0221 701/25 |
| 2013/0138246 A1* | 5/2013 | Gutmann | G05D 1/0231 700/253 |
| 2013/0190963 A1* | 7/2013 | Kuss | B66F 9/063 701/23 |
| 2013/0245877 A1* | 9/2013 | Ferguson | B60R 1/00 701/23 |
| 2014/0236414 A1* | 8/2014 | Droz | G08G 1/161 701/28 |
| 2015/0168953 A1 | 6/2015 | Smid | |
| 2015/0274160 A1* | 10/2015 | Lee | B62D 6/002 701/41 |
| 2017/0120804 A1* | 5/2017 | Kentley | G05D 1/0088 |
| 2017/0129372 A1* | 5/2017 | Hein | B60N 2/39 |
| 2017/0277197 A1* | 9/2017 | Liao | G05D 1/0253 |
| 2017/0308989 A1* | 10/2017 | Lee | B60R 11/04 |
| 2017/0357270 A1* | 12/2017 | Russell | G05D 1/0094 |
| 2018/0009418 A1* | 1/2018 | Newman | G01S 17/936 |
| 2018/0113200 A1* | 4/2018 | Steinberg | G01S 7/497 |
| 2018/0143298 A1* | 5/2018 | Newman | G01S 13/862 |
| 2018/0354523 A1* | 12/2018 | Kishi | B60W 40/08 |
| 2019/0011544 A1* | 1/2019 | Gassend | G01S 17/023 |
| 2019/0018416 A1* | 1/2019 | Gassend | G05D 1/0094 |
| 2019/0113916 A1* | 4/2019 | Guo | A61B 5/6893 |

OTHER PUBLICATIONS

Vodicheva et al., "Improving the Accuracy of Angular Rate Determination for Spinning Vehicles," Gyroscopy and Navigation, vol. 3, No. 3, 2012, pp. 159-167.

IEEE, "IEEE Standard for Inertial Sensor Terminology," IEEE Std 528-2001, 2001.

Chatfield, Averil B., "Fundamentals of High Accuracy Inertial Navigation," Table of Contents, AIAA,1997.

Beader, Mark E., "Application of Roll-isolated Inertial Measurement Units to the Instrumentation of Spinning Vehicles," SAND2000-3070, Sandia National Laboratories, 2000.

Lawrence, A., "Modern Inertial Technology: Navigation, Guidance, and Control," Springer-Verlag, Chapter 2, pp. 25-42, 1998.

International Search Report and Written Opinion of corresponding International Application No. PCT/US2017/052415 (dated Dec. 13, 2017).

* cited by examiner

DEVICES AND METHODS FOR A SENSOR PLATFORM OF A VEHICLE

BACKGROUND

Unless otherwise indicated herein, the materials described in this section are not prior art to the claims in this application and are not admitted to be prior art by inclusion in this section.

A direction sensor, such as a gyroscope, can be utilized to measure a direction or orientation of the direction sensor. For example, a gyroscope can provide an indication of a rate of change to the direction of the gyroscope relative to a reference axis of the gyroscope. In this example, a computing system can keep track of the rate measurements indicated by the gyroscope to determine the direction of gyroscope.

SUMMARY

In one example, a vehicle includes a platform and a yaw sensor mounted on the platform. The yaw sensor provides an indication of a yaw rate of rotation of the yaw sensor. The vehicle also includes an actuator that rotates the platform. The vehicle also includes a controller coupled to the yaw sensor and the actuator. The controller receives the indication of the yaw rate from the yaw sensor. The controller also causes the actuator to rotate the platform (i) along a direction of rotation opposite to a direction of the rotation of the yaw sensor and (ii) at a rate of rotation based on the yaw rate of the yaw sensor. The controller also estimates a direction of motion of the vehicle in an environment of the vehicle based on at least the rate of rotation of the platform.

In another example, a method involves receiving an indication of a yaw rate of rotation of a yaw sensor mounted on a platform of a vehicle. The method also involves rotating the platform according to (i) a direction of rotation opposite to a direction of the rotation of the yaw sensor and (ii) a rate of rotation based on the yaw rate of the yaw sensor. The method also involves estimating a direction of the vehicle in an environment based on at least the rate of rotation of the platform.

In yet another example, a method involves obtaining sensor data collected using a sensor mounted on a platform of a vehicle. The sensor data includes an indication of a rate of change to a direction of the sensor about a reference axis of the sensor. The method also involves rotating the platform such that (i) a direction of the rotation is opposite to a direction of the change to the direction of the sensor and (ii) a rate of the rotation is based on the rate of change to the direction of the sensor. The method also involves estimating a direction of the vehicle in an environment based on at least the rate of rotation of the platform.

In still another example, a system includes means for receiving an indication of a yaw rate of rotation of a yaw sensor mounted on a platform of a vehicle. The system also includes means for rotating the platform according to (i) a direction of rotation opposite to a direction of the rotation of the yaw sensor and (ii) a rate of rotation based on the yaw rate of the yaw sensor. The system also includes means for estimating a direction of the vehicle in an environment based on at least the rate of rotation of the platform.

In still yet another example, a system includes means for obtaining sensor data collected using a sensor mounted on a platform of a vehicle. The sensor data includes an indication of a rate of change to a direction of the sensor about a reference axis of the sensor. The system also includes means for rotating the platform such that (i) a direction of the rotation is opposite to a direction of the change to the direction of the sensor and (ii) a rate of the rotation is based on the rate of change to the direction of the sensor. The system also includes means for estimating a direction of the vehicle in an environment based on at least the rate of rotation of the platform.

These as well as other aspects, advantages, and alternatives, will become apparent to those of ordinary skill in the art by reading the following detailed description, with reference where appropriate to the accompanying figures.

DETAILED DESCRIPTION

Figure 1A:
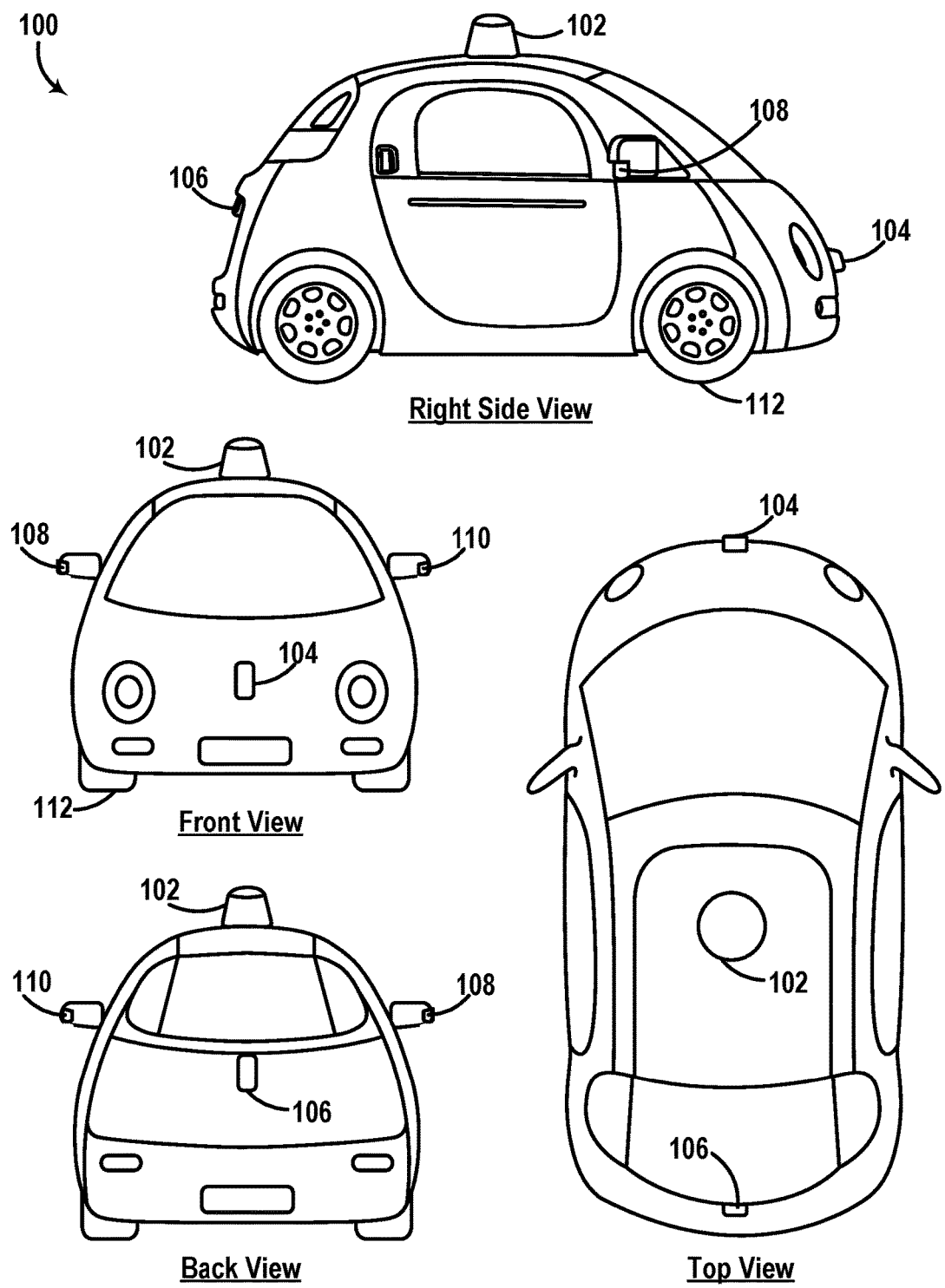
FIG. 1A illustrates a vehicle, according to an example embodiment.

The following detailed description describes various features and functions of the disclosed implementations with reference to the accompanying figures. In the figures, similar symbols identify similar components, unless context dictates otherwise. The illustrative implementations described herein are not meant to be limiting. It may be readily understood by those skilled in the art that certain aspects of the disclosed implementations can be arranged and combined in a wide variety of different configurations.

I. Overview

In some situations, measurements indicated by a sensor, such as a gyroscope for instance, can be prone to errors. Example measurement errors or offsets for a gyroscope may include scale factor errors and/or bias errors, among others. A bias error may include an error or offset that is independent from the value of the measurement indicated by the gyroscope. A scale factor error may include an error or offset that increases (linearly or non-linearly) as the value of the measurement indicated by the gyroscope increases. Sensor measurement errors may be due to physical characteristics of the sensor (e.g., semiconductor properties, mechanical properties, etc.), manufacturing variability between individual sensors, and/or environmental factors (e.g., temperature, humidity, etc.) that affect operation of the sensor, among other factors.

In some implementations, a sensor can be calibrated to measure or otherwise model such errors or offsets. The resulting calibration data can then be used to modify future outputs from the sensor to mitigate the effect of these errors. However, in some examples, the extent, magnitude, and/or other characteristics of these errors may change over time (e.g., drift). As a result, for instance, calibrated sensor measurements may potentially become prone to errors after passage of a certain amount of time from a time when the calibration process is performed. Moreover, in some examples, calibration may be less suitable for mitigating a particular type of error. For instance, some types of measurement errors could randomly or rapidly change or could otherwise be unsuitable for modelling via a calibration process alone.

Additionally, in some scenarios, the sensor calibration process can be time-consuming and/or associated with high calibration (e.g., maintenance) costs. By way of example, consider a scenario where the sensor is mounted to a vehicle, such as a car, truck, boat, or any other vehicle. Calibrating the sensor in this scenario may involve, for instance, driving or otherwise transporting the vehicle to a maintenance location, unmounting the sensor from the vehicle, mounting the sensor to a calibration or test platform, applying a series of sensor inputs to the sensor (e.g., rotating a direction sensor according to a sequence of predetermined rates of rotation, etc.) to generate the calibration data, unmounting the sensor from the test platform, remounting the sensor to the vehicle, and removing or otherwise transporting the vehicle from the maintenance location.

Accordingly, the present disclosure may include additional and/or alternative implementations to mitigate the effect of sensor measurement errors. In one implementation, an example vehicle includes a rotating platform, an actuator (e.g., motor, etc.) that rotates the platform, and a yaw sensor mounted on the platform. The yaw sensor provides an indication of a yaw rate of rotation of the yaw sensor about a yaw axis of the yaw sensor. For example, the yaw sensor may comprise a gyroscope arranged to have a reference axis that is aligned with or substantially parallel to a yaw axis of the vehicle. Thus, in this example, if the direction of motion (e.g., yaw direction, yaw orientation, driving direction, navigation path direction, etc.) of the vehicle changes (e.g., when the vehicle performs a right turn or a left turn), then the amount and/or rate of change to the direction of the vehicle may be similar to (or may correspond to) the amount and/or rate of change to a yaw direction of the yaw sensor.

In this implementation, the vehicle also includes a controller (e.g., computing device, circuitry, control system, etc.) that receives the indication of the yaw rate provided by the yaw sensor. The controller also uses the received indication as a basis for operating the actuator to rotate the platform (i) along a direction of rotation opposite to a direction of the yaw rotation of the yaw sensor and (ii) at a rate of rotation based on the yaw rate of the yaw sensor. For example, the controller can modulate an electrical signal that controls the actuator to cause a rotation of the platform against the yaw rotation measured by the yaw sensor, thereby driving the yaw rate measured by the yaw sensor toward a value of zero or toward another constant/target value. In one example, the controller can be implemented as a proportional-integral (PI) controller that involves a control loop feedback mechanism for driving the measured yaw rate toward a value of zero (or other constant/target value). Thus, in this example, the rate of rotation of the platform can be based on an integral of the measured yaw rate. However, other implementations are possible as well and are described in greater detail within exemplary embodiments herein. Regardless of the implementation, through this process for instance, the range of yaw rate measurements detected by the yaw sensor may remain close to zero. As a result, scale factor errors dependent on the value or magnitude of the measured yaw rate can be reduced or mitigated.

Additionally, in this implementation, the controller can also estimate the direction of motion of the vehicle in an environment (e.g., yaw orientation) based on the rate of rotation of the platform. For example, the vehicle may also include an encoder that measures the orientation (or changes thereto) of the platform. As the vehicle turns, for instance, the yaw rate measurements indicated by the yaw sensor may responsively increase to indicate a particular direction of change to the yaw direction of the yaw sensor, and the vehicle may responsively rotate the platform along an opposite direction and with a rate of rotation that is similar to the rate at which the vehicle is turning. Thus, the controller can estimate the change in the direction of the vehicle by accounting for characteristics of the rotation of the platform.

Additionally, with this arrangement, the calibration and/or re-calibration process of the yaw sensor can be improved. For example, the vehicle can perform the calibration process without unmounting the sensor and then remounting the sensor to the vehicle.

Accordingly, in some implementations, the vehicle also includes data storage storing calibration data for the yaw sensor. The calibration data, for example, may indicate a mapping between previously measured yaw rates indicated by the sensor and predetermined rates of rotation of the platform. Additionally or alternatively, in some examples, the mapping may associate the previously measured yaw rates with respective rotational positions of the platform. For instance, the rotational positions of the platform could be measured relative to a rotational axis of the platform, and may be indicated by an encoder or other orientation sensor configured to measure a rotational position or orientation of the platform. The controller may also be configured to update the calibration data stored in the data storage. To do so, for example, the controller may cause the actuator to rotate the platform according to a sequence of the predetermined rates of rotation, receive respective indications of yaw rates measured by the yaw sensor responsive to the rotation of the platform according to the sequence, and modify the mapping to associate the received yaw rate measurements to the predetermined rates of rotation. In one implementation, the vehicle may include a conditioning device (e.g., heating device, cooling device, etc.) that adjusts the temperature of air surrounding the yaw sensor (and/or the temperature of the yaw sensor). In this implementation, the vehicle may repeat the calibration process to determine different mappings associated with different temperatures.

Additionally or alternatively, the calibration procedure can be triggered in various ways. In a first example, the vehicle may include an input interface that receives an input from a user requesting calibration of the yaw sensor. In a second example, the controller may monitor passage of time from a time of a previous calibration, and may then initiate the calibration process in response to at least passage of a threshold amount of time from the time of the previous calibration. In a third example, the vehicle may also include a temperature sensor, and the controller may initiate the calibration process in response to a measured temperature by the sensor having at least a threshold difference from a previously measured temperature associated with the stored calibration data. In a fourth example, the controller may initiate the calibration in response to activation of the vehicle (e.g., when the vehicle is powered or when the vehicle enters a driving mode, etc.).

In some situations, the estimated yaw direction of the vehicle may still be prone to errors due to vehicle dynamics when the vehicle is turning around a corner. In an example scenario, the vehicle may perform a sharp right turn maneuver that causes the vehicle to bank or roll to the left. As a result of the change to the roll orientation of the vehicle in this scenario, the yaw axis of the yaw sensor (and the vehicle) may become tilted relative to an initial direction of the yaw axis when the vehicle is travelling along a straight path.

Accordingly, in some implementations, the vehicle also includes a pitch sensor that indicates a pitch orientation of the vehicle. In this implementation, the controller estimates the direction of motion of the vehicle based also on output from the pitch sensor. Further, in some implementations, the vehicle may also include a roll sensor that indicates a roll orientation of the vehicle. In these implementations, the controller may estimate the direction of the vehicle based on the pitch orientation in response to the roll sensor indicating at least a threshold amount of change to the roll orientation of the vehicle.

Alternatively or additionally, in one implementation, the vehicle may include a second actuator coupled to the platform to adjust a tilting angle of the platform. For example, in the scenario where the vehicle performs a sharp right turn maneuver, the controller can operate the second actuator to tilt the platform supporting the yaw sensor and thus reduce the tilt offset of the yaw axis of the yaw sensor caused by the tilting of the vehicle during the maneuver.

In another implementation, the vehicle may include a second yaw sensor. In this implementation, the first yaw sensor (e.g., mounted to the platform) can be mounted to the vehicle at a first tilting angle such that a first yaw axis of the first yaw sensor is at a first offset to the yaw axis of the vehicle. Further, the second yaw sensor can be mounted at a second tilting angle such that a second yaw axis of the second yaw sensor is at a second offset to the yaw axis of the vehicle. In one example, the controller can then estimate the yaw direction of the vehicle by selecting one of the two yaw sensors depending on the roll direction (e.g., banking direction) of the vehicle. For instance, the first yaw sensor can be tilted toward a left side of the vehicle, and the second yaw sensor can be tilted toward a right side of the vehicle. Thus, the controller can select the first yaw sensor when the vehicle rolls to the right side as the first yaw axis may become relatively more aligned with the yaw axis of the vehicle. Whereas, for instance, the controller can select the second yaw sensor when the vehicle rolls to the left side as the second yaw axis may become relatively more aligned with the yaw axis of the vehicle.

Other example arrangements, configurations, and operations of a vehicle that includes an adjustable sensor platform are possible as well and are described in greater detail within exemplary embodiments of the present disclosure.

II. Example Systems and Devices

Systems and devices in which example embodiments may be implemented will now be described in greater detail. In general, the embodiments disclosed herein can be used with any moving device that includes a direction sensor. Illustrative embodiments described herein include vehicles. However, an example electromechanical system may also be implemented in or take the form of other devices, such as sensing platforms (e.g., rotational RADAR platforms, rotational LIDAR platforms, directional sensing platforms, etc.), robotic devices, industrial systems (e.g., assembly lines, etc.), medical devices, or mobile communication systems, among other possibilities.

The term "vehicle" is broadly construed herein to cover any moving object, including, for instance, an aerial vehicle, watercraft, spacecraft, a car, a truck, a van, a semi-trailer truck, a motorcycle, a golf cart, an off-road vehicle, a warehouse transport vehicle, or a farm vehicle, as well as a carrier that rides on a track such as a rollercoaster, trolley, tram, or train car, among other examples.

FIG. 1A illustrates a vehicle 100, according to an example embodiment. In particular, FIG. 1A shows a Right Side View, Front View, Back View, and Top View of the vehicle 100. Although vehicle 100 is illustrated in FIG. 1A as a car, as discussed above, other embodiments are possible. Furthermore, although the example vehicle 100 is shown as a vehicle that may be configured to operate in autonomous mode, the embodiments described herein are also applicable to vehicles that are not configured to operate autonomously or that are configured to operate semi-autonomously. Thus, the example vehicle 100 is not meant to be limiting. As shown, the vehicle 100 includes five sensor units 102, 104, 106, 108, and 110, and four wheels, exemplified by wheel 112.

In some embodiments, sensor units 102-110 may include any combination of sensors, such as global positioning system sensors, inertial measurement units, radio detection and ranging (RADAR) units, cameras, laser rangefinders, LIDARs, and/or acoustic sensors among other possibilities.

As shown, sensor unit 102 is mounted to a top side of the vehicle 100 opposite to a bottom side of the vehicle 100 where the wheel 112 is mounted. Further, sensor units 104-110 are respectively mounted to respective sides of vehicle 100 other than the top side. As shown, sensor unit 104 is positioned at a front side of vehicle 100, sensor 106 is positioned at a back side of vehicle 100, the sensor unit 108 is positioned at a right side of vehicle 100, and sensor unit 110 is positioned at a left side of vehicle 100.

Although sensor units 102-110 are shown to be mounted in particular locations on vehicle 100, in some embodiments, sensor units 102-110 can be alternatively mounted in different locations, either inside or outside vehicle 100. For example, although FIG. 1A shows sensor unit 108 mounted to a rear-view mirror of vehicle 100, the sensor unit 108 may alternatively be positioned in another location along the right side of vehicle 100. As another example, vehicle 100 can be implemented to include more sensor units mounted along a roof (e.g., top side) of vehicle 100, and fewer or no sensors mounted along other sides (e.g., right side, left side, etc.) of vehicle 100. Other arrangements and configurations of sensor units 102-110 are possible as well. Thus, while five sensor units are shown, in some embodiments, more or fewer sensor units may be included in vehicle 100. However, for the sake of example, sensor units 102-110 are positioned as shown in FIG. 1A.

In some embodiments, one or more of sensor units 102-110 may include one or more movable mounts on which the sensors may be movably mounted. The movable mount may include, for example, a rotating platform. Alternatively or additionally, the movable mount may include a tilting platform. Sensors mounted on the tilting platform could be tilted within a given range of angles and/or azimuths. The movable mount may take other forms as well.

Further, in some embodiments, one or more of sensor units 102-110 may include one or more actuators configured to adjust the position and/or orientation of sensors in the sensor unit by moving the sensors and/or movable mounts. Example actuators include motors, pneumatic actuators, hydraulic pistons, relays, solenoids, and piezoelectric actuators. Other actuators are possible as well.

As shown, vehicle 100 includes one or more wheels such as wheel 112 that are configured to rotate to cause the vehicle to travel along a driving surface. In some embodiments, wheel 112 may include at least one tire coupled to a rim of wheel 112. To this end, wheel 112 may include any combination of metal and rubber, or a combination of other materials. Vehicle 100 may include one or more other components in addition to or instead of those shown.

Figure 1B:
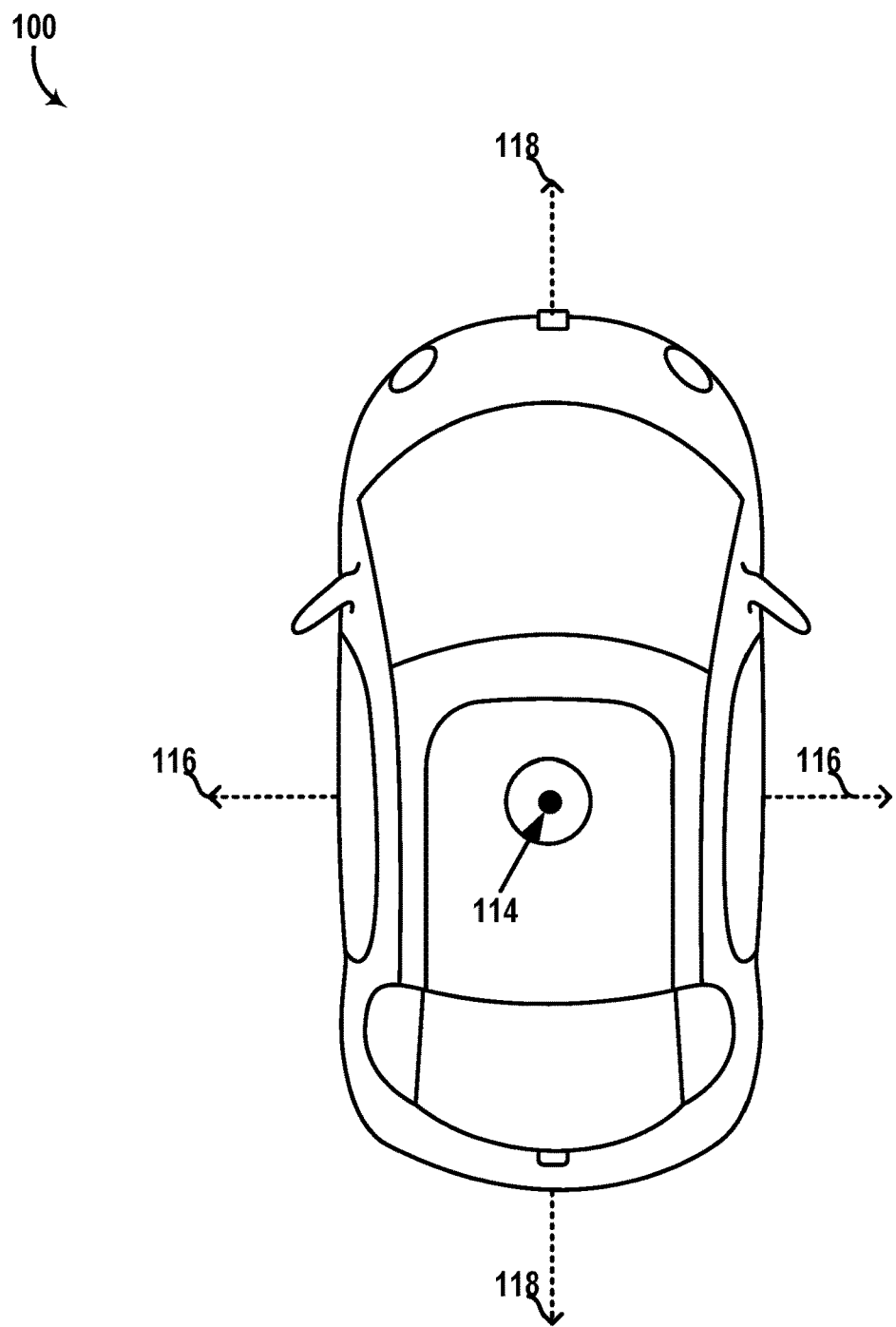
FIG. 1B is another illustration of the vehicle of FIG. 1A.

FIG. 1B illustrates another top view of vehicle 100. In some scenarios, vehicle 100 may rotate about one or more axes of rotation of vehicle 100, which are shown as yaw axis 114, pitch axis 116, and roll axis 118. Yaw axis 114 may correspond to a height-wise axis extending through the top of the vehicle (and out of the page). In an example scenario, a yaw rotation of vehicle 100 about yaw axis 114 may correspond to adjusting a pointing or heading direction of vehicle 100 (e.g., direction of motion or travel along a driving surface, etc.).

Pitch axis 116 may correspond to a rotational axis that extends widthwise through the right side and left side of vehicle 100. In an example scenario, a pitch rotation of vehicle 100 about pitch axis 116 may result from an acceleration or deceleration (e.g., application of brakes, etc.) of vehicle 100. For instance, a deceleration of the vehicle may cause the vehicle to tilt toward the front side of the vehicle (i.e., pitch rotation about pitch axis 116). In this scenario, front wheel shocks (not shown) of vehicle 100 may compress to absorb the force due to the change of momentum of the vehicle, and back wheel shocks (not shown) may expand to allow the vehicle to tilt toward the front side. In another example scenario, a pitch rotation of vehicle 100 about pitch axis 116 may result from vehicle 100 traveling along a sloped driving surface (e.g., hill, etc.), thereby causing vehicle 100 to tilt upwards or downwards (i.e., pitch-wise) depending on the slope of the driving surface. Other scenarios are possible as well.

Roll axis 118 may correspond to a rotational axis that extends lengthwise through the front side and the back side of vehicle 100. In an example scenario, a roll rotation of vehicle 100 about roll axis 118 may occur in response to the vehicle performing a turning maneuver. For instance, if the vehicle performs a sudden right turn maneuver, the vehicle may bank toward the left side (i.e., roll rotation about roll axis 118) in response to a force caused by the changing momentum of the vehicle or a centripetal force acting on the vehicle due to the right turn maneuver, etc. In another example scenario, a roll rotation of vehicle 100 about roll axis 118 may occur as a result of vehicle 100 traveling along a curved driving surface (e.g., road camber, etc.), which may cause vehicle 100 to tilt sideways (i.e., roll-wise) depending on the curvature of the driving surface. Other scenarios are possible as well.

It is noted that the positions of the various rotational axes 114, 116, 118 may vary depending on various physical characteristics of vehicle 100, such as the location of a center of gravity of the vehicle, locations and/or mounting positions of wheels of the vehicle, etc. Thus, the various axes 114, 116, 118 are illustrated as shown only for the sake of example. For instance, roll axis 118 can be alternatively positioned to have a different path through the front side and back side of vehicle 118, and yaw axis 114 may extend through a different region of the top side of vehicle 100 than that shown, etc.

Figure 2:
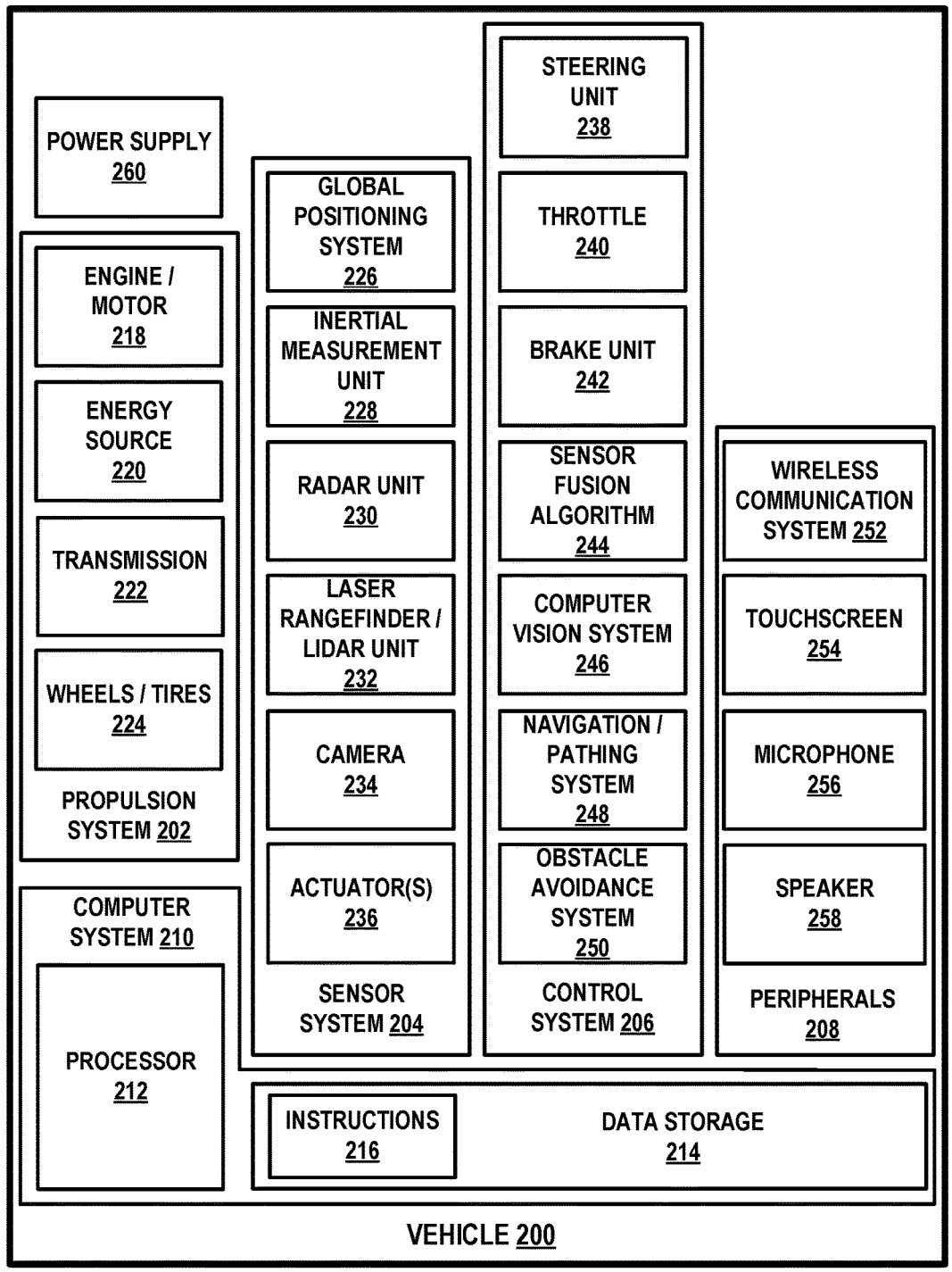
FIG. 2 is a simplified block diagram of a vehicle, according to an example embodiment.

FIG. 2 is a simplified block diagram of a vehicle 200, according to an example embodiment. Vehicle 200 may be similar to vehicle 100, for example. As shown, vehicle 200 includes a propulsion system 202, a sensor system 204, a control system 206, peripherals 208, and a computer system 210. In other embodiments, vehicle 200 may include more, fewer, or different systems, and each system may include more, fewer, or different components. Further, the systems and components shown may be combined or divided in any number of ways.

Propulsion system 202 may be configured to provide powered motion for the vehicle 200. As shown, propulsion system 202 includes an engine/motor 218, an energy source 220, a transmission 222, and wheels/tires 224.

Engine/motor 218 may be or include any combination of an internal combustion engine, an electric motor, a steam engine, and a Stirling engine. Other motors and engines are possible as well. In some embodiments, propulsion system 202 may include multiple types of engines and/or motors. For instance, a gas-electric hybrid car may include a gasoline engine and an electric motor. Other examples are possible.

Energy source 220 may be a source of energy that powers the engine/motor 218 in full or in part. That is, engine/motor 218 may be configured to convert energy source 220 into mechanical energy. Examples of energy sources 220 include gasoline, diesel, propane, other compressed gas-based fuels, ethanol, solar panels, batteries, and other sources of electrical power. Energy source(s) 220 may additionally or alternatively include any combination of fuel tanks, batteries, capacitors, and/or flywheels. In some embodiments, energy source 220 may provide energy for other systems of vehicle 200 as well.

Transmission 222 may be configured to transmit mechanical power from engine/motor 218 to wheels/tires 224. To this end, transmission 222 may include a gearbox, clutch, differential, drive shafts, and/or other elements. In embodiments where transmission 222 includes drive shafts, the drive shafts may include one or more axles that are configured to be coupled to wheels/tires 224.

Wheels/tires 224 of vehicle 200 may be configured in various formats, including a unicycle, bicycle/motorcycle, tricycle, or car/truck four-wheel format. Other wheel/tire formats are possible as well, such as those including six or more wheels. In any case, wheels/tires 224 may be configured to rotate differentially with respect to other wheels/tires 224. In some embodiments, wheels/tires 224 may include at least one wheel that is fixedly attached to transmission 222 and at least one tire coupled to a rim of the wheel that could make contact with a driving surface. Wheels/tires 224 may include any combination of metal and rubber, or combination of other materials. Propulsion system 202 may additionally or alternatively include components other than those shown.

Sensor system 204 may include any number of sensors configured to sense information about vehicle 200 and/or an environment in which vehicle 200 is located, as well as one or more actuators 236 configured to modify a position and/or orientation of the sensors. As shown, the sensors of sensor system 204 include a Global Positioning System (GPS) 226, an inertial measurement unit (IMU) 228, a RADAR unit 230, a laser rangefinder and/or LIDAR unit 232, and a camera 234. Sensor system 204 may include additional sensors as well, including, for example, sensors that monitor internal systems of vehicle 200 (e.g., an $O_2$ monitor, a fuel gauge, an engine oil temperature, etc.). In some examples, sensor system 204 may be implemented as multiple sensor units each mounted to the vehicle in a respective position (e.g., top side, bottom side, front side, back side, right side, left side, etc.). Other sensors are possible as well.

GPS 226 may include any sensor (e.g., location sensor) configured to estimate a geographic location of vehicle 200. In some examples, vehicle 200 (or a component thereof) could determine a velocity of vehicle 200 and/or timing information (e.g., time, date, etc.) based on output from GPS 226. To this end, for example, GPS 226 may include a transceiver configured to estimate a position of vehicle 200 with respect to the Earth, and/or estimate other data (e.g., velocity, time, etc.) based on signals from satellite(s) and/or other devices in an environment of vehicle 200, among other possibilities.

IMU 228 may be any combination of sensors configured to sense position and orientation changes of the vehicle 200 based on inertial acceleration. For example, the combination of sensors may include accelerometers and gyroscopes, among others.

RADAR unit 230 may include any sensor configured to sense objects in the environment in which the vehicle 200 is located using radio signals. In some embodiments, in addition to sensing the objects, RADAR unit 230 may be configured to sense the speed and/or heading of the objects.

Similarly, laser range finder or LIDAR unit 232 may include any sensor configured to sense objects in the environment in which vehicle 200 is located using lasers. In particular, laser rangefinder or LIDAR unit 232 may include a laser source and/or laser scanner configured to emit a laser and a detector configured to detect reflections of the laser. Laser rangefinder or LIDAR 232 may be configured to operate in a coherent (e.g., using heterodyne detection) or an incoherent detection mode. In some examples, LIDAR unit 232 may include multiple LIDARs that each have a unique position and/or configuration suitable for scanning a particular region of an environment around vehicle 200.

Camera 234 may include any camera (e.g., a still camera, a video camera, etc.) configured to capture images of the environment in which vehicle 200 is located. To this end, the camera may take any of the forms described above. Sensor system 204 may additionally or alternatively include components other than those shown.

Actuator(s) 236 may include any type of actuator configured to adjust a position, orientation, and/or pointing direction of one or more of the sensors in sensor system 204. Example actuators include motors, pneumatic actuators, hydraulic pistons, relays, solenoids, and piezoelectric actuators. Other actuators are possible as well.

Control system 206 may be configured to control operation of the vehicle 200 and its components. To this end, control system 206 may include a steering unit 238, a throttle 240, a brake unit 242, a sensor fusion algorithm 244, a computer vision system 246, a navigation or pathing system 248, and an obstacle avoidance system 250.

Steering unit 238 may be any combination of mechanisms configured to adjust the heading of vehicle 200. Throttle 240 may be any combination of mechanisms configured to control the operating speed of engine/motor 218 and, in turn, the speed of vehicle 200. Brake unit 242 may be any combination of mechanisms configured to decelerate vehicle 200. For example, brake unit 242 may use friction to slow wheels/tires 224. As another example, brake unit 242 may convert kinetic energy of wheels/tires 224 to electric current. Brake unit 242 may take other forms as well.

Sensor fusion algorithm 244 may be an algorithm (or a computer program product storing an algorithm) configured to accept data from sensor system 204 as an input. The data may include, for example, data representing information sensed at the sensors of sensor system 204. Sensor fusion algorithm 244 may include, for example, a Kalman filter, a Bayesian network, an algorithm for some of the functions of the methods herein, or any other algorithm. Sensor fusion algorithm 244 may further be configured to provide various assessments based on the data from sensor system 204, including, for example, evaluations of individual objects and/or features in the environment in which vehicle 100 is located, evaluations of particular situations, and/or evaluations of possible impacts based on particular situations. Other assessments are possible as well.

Computer vision system 246 may be any system configured to process and analyze images captured by camera 234 in order to identify objects and/or features in the environment in which vehicle 200 is located, including, for example, traffic signals and obstacles. To this end, computer vision system 246 may use an object recognition algorithm, a Structure from Motion (SFM) algorithm, video tracking, or other computer vision techniques. In some embodiments, computer vision system 246 may additionally be configured to map the environment, track objects, estimate the speed of objects, etc.

Navigation and pathing system 248 may be any system configured to determine a driving path for vehicle 200. Navigation and pathing system 248 may additionally be configured to update the driving path dynamically while vehicle 200 is in operation. In some embodiments, navigation and pathing system 248 may be configured to incorporate data from sensor fusion algorithm 244, GPS 226, LIDAR unit 232, and one or more predetermined maps so as to determine the driving path for vehicle 200.

Obstacle avoidance system 250 may be any system configured to identify, evaluate, and avoid or otherwise negotiate obstacles in the environment in which vehicle 200 is located. Control system 206 may additionally or alternatively include components other than those shown.

Peripherals 208 (e.g., input interface, output interface, etc.) may be configured to allow vehicle 200 to interact with external sensors, other vehicles, external computing devices, and/or a user. To this end, peripherals 208 may include, for example, a wireless communication system 252, a touchscreen 254, a microphone 256, and/or a speaker 258.

Wireless communication system 252 may be any system configured to wirelessly couple to one or more other vehicles, sensors, or other entities, either directly or via a communication network. To this end, wireless communication system 252 may include an antenna and a chipset for communicating with the other vehicles, sensors, servers, or other entities either directly or via a communication network. Chipset or wireless communication system 252 in general may be arranged to communicate according to one or more types of wireless communication (e.g., protocols) such as Bluetooth, communication protocols described in IEEE 802.11 (including any IEEE 802.11 revisions), cellular technology (such as GSM, CDMA, UMTS, EV-DO, WiMAX, or LTE), Zigbee, dedicated short range communications (DSRC), and radio frequency identification (RFID) communications, among other possibilities. Wireless communication system 252 may take other forms as well.

Touchscreen 254 may be used by a user as an input interface to input commands to vehicle 200. To this end, touchscreen 254 may be configured to sense at least one of a position and a movement of a user's finger via capacitive sensing, resistance sensing, or a surface acoustic wave process, among other possibilities. Touchscreen 254 may be capable of sensing finger movement in a direction parallel or planar to the touchscreen surface, in a direction normal to the touchscreen surface, or both, and may also be capable of sensing a level of pressure applied to the touchscreen surface. Touchscreen 254 may be formed of one or more translucent or transparent insulating layers and one or more translucent or transparent conducting layers. Touchscreen 254 may take other forms as well.

Microphone 256 (e.g., "input interface") may be configured to receive audio (e.g., a voice command or other audio input) from a user of vehicle 200. Similarly, speakers 258 may be configured to output audio to the user of vehicle 200. Peripherals 208 may additionally or alternatively include components other than those shown.

Computer system 210 may be configured to transmit data to, receive data from, interact with, and/or control one or more of propulsion system 202, sensor system 204, control system 206, and peripherals 208. To this end, computer system 210 may be communicatively linked to one or more of propulsion system 202, sensor system 204, control system 206, and peripherals 208 by a system bus, network, and/or other connection mechanism (not shown).

In one example, computer system 210 may be configured to control operation of transmission 222 to improve fuel efficiency. As another example, computer system 210 may be configured to cause camera 234 to capture images of the environment. As yet another example, computer system 210 may be configured to store and execute instructions corresponding to sensor fusion algorithm 244. Other examples are possible as well.

As shown, computer system 210 includes processor 212 and data storage 214. Processor 212 may comprise one or more general-purpose processors and/or one or more special-purpose processors. To the extent processor 212 includes more than one processor, such processors could work separately or in combination. Data storage 214, in turn, may comprise one or more volatile and/or one or more non-volatile storage components, such as optical, magnetic, and/or organic storage among other possibilities, and data storage 214 may be integrated in whole or in part with processor 212.

In some embodiments, data storage 214 may contain instructions 216 (e.g., program logic) executable by processor 212 to execute various vehicle functions. Data storage 214 may contain additional instructions as well, including instructions to transmit data to, receive data from, interact with, and/or control one or more of propulsion system 202, sensor system 204, control system 206, and/or peripherals 208. In some embodiments data storage 214 may also contain calibration data for one or more of the sensors in sensor system 204. For example, the calibration data may include a mapping between previously obtained sensor measurements and one or more predetermined inputs to the sensors. Computer system 210 may additionally or alternatively include components other than those shown.

As shown, vehicle 200 further includes a power supply 260, which may be configured to provide power to some or all of the components of vehicle 200. To this end, power supply 260 may include, for example, a rechargeable lithium-ion or lead-acid battery. In some embodiments, one or more banks of batteries could be configured to provide electrical power. Other power supply materials and configurations are possible as well. In some embodiments, power supply 260 and energy source 220 may be implemented together as one component, as in some all-electric cars.

In some embodiments, vehicle 200 may include one or more elements in addition to or instead of those shown. For example, vehicle 200 may include one or more additional interfaces and/or power supplies. Other additional components are possible as well. In such embodiments, data storage 214 may further include instructions executable by processor 212 to control and/or communicate with the additional components.

Still further, while each of the components and systems are shown to be integrated in vehicle 200, in some embodiments, one or more components or systems may be removably mounted on or otherwise connected (mechanically or electrically) to vehicle 200 using wired or wireless connections. Vehicle 200 may take other forms as well.

III. Example Sensor Unit Configurations

Figure 3:
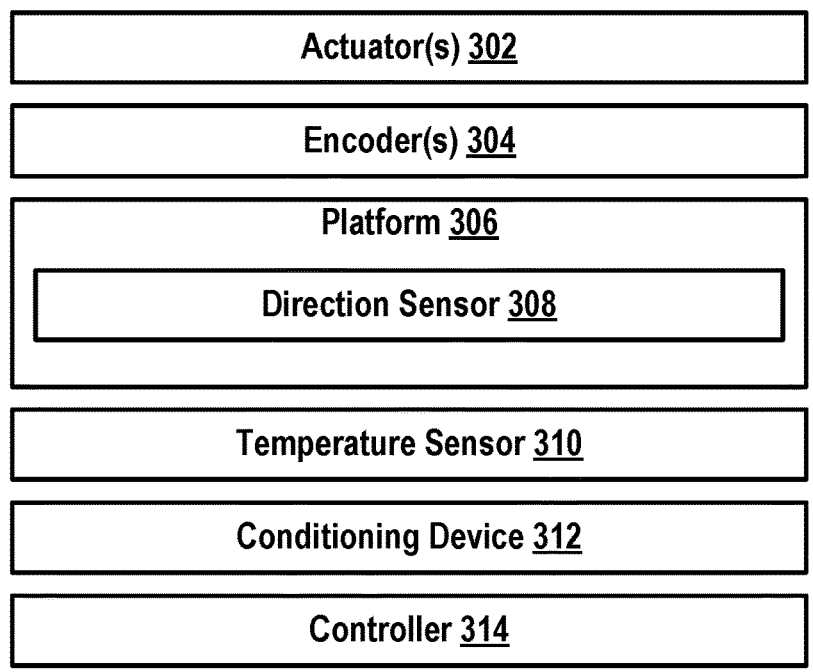
FIG. 3 is a simplified block diagram of a sensor unit that includes an adjustable sensor platform, according to an example embodiment.

FIG. 3 is a simplified block diagram of a sensor unit device 300 that includes an adjustable sensor mounting platform 306, according to an example embodiment. Sensor unit 300 may be similar to sensor units 102, 104, 106, 108, 110, and/or any combination of the components in sensor system 204. As shown, sensor unit 300 includes one or more actuators 302, one or more encoders 304, a sensor platform 306, a temperature sensor 310, a conditioning device 312, and a controller 314. It is noted that sensor unit 300 may include additional or fewer components than those shown. In one example, sensor unit 300 may include any of the components of vehicle 200 in addition to or instead of the components shown. In another example, device 300 can be implemented without temperature sensor 310 and/or without conditioning device 312. Other examples are possible as well.

Actuator(s) 302 may include one or more actuators similar to actuator(s) 236. In one implementation, actuator 302 may be configured to rotate platform 306 about an axis of rotation that is substantially parallel to an axis of rotation of a vehicle (e.g., yaw axis, roll axis, pitch axis, etc.), and/or any other axis of rotation.

Encoder(s) 304 may include any combination of encoders (e.g., mechanical encoders, optical encoders, magnetic encoders, capacitive encoders, etc.), and may be configured to provide an indication of an orientation of platform 306 in response to actuator 302 rotating platform 306.

Platform 306 may include any solid structure suitable for mounting a sensor (e.g., sensor 308). For example, platform 306 may include a rotor platform that rotates relative to a stator platform in a rotary joint configuration.

Sensor 308 may include any combination of the sensors included in sensor system 204. In some implementations, sensor 308 comprises a direction sensor, such as a gyroscope for instance, that is mounted on platform 306 and aligned with a directional axis of a vehicle (e.g., axis 114, 116, or 118) to provide an indication of a direction of motion of the vehicle. For example, a gyroscope sensor 308 may provide an output signal that indicates a rate of change in a pointing direction of the gyroscope sensor (e.g., yaw direction, pitch direction, roll direction, etc.) in response to motion of the gyroscope (e.g., due to the rotation of platform 306 or motion of a vehicle that includes sensor unit 300). Thus, in various examples, sensor 308 can be configured as a "yaw sensor" that provides an indication of a yaw rate of rotation of the yaw sensor (e.g., rate of rotation of the sensor about axis 114 of vehicle 100), a "pitch sensor" that provides an indication of a pitch rate, or a "roll sensor" that provides an indication of a roll rate.

Temperature sensor 310 may comprise any type of temperature sensor such as a thermometer, thermistor, thermocouple, resistance thermometer, silicon bandgap temperature sensor, among others. In some examples, temperature sensor 310 can be arranged adjacent or near sensor 308 to provide an indication of a temperature of sensor 308 and/or a temperature of air surrounding sensor 308. For example, temperature sensor 310 can be used during calibration to associate the measured temperature with the measurements provided by sensor 308.

Conditioning device 312 may comprise any type of temperature conditioning device such as an air conditioner, a heating element, a resistive heating element, an air cooling device, among other examples. In some implementations, conditioning device 312 can be arranged near and/or coupled to sensor 308 to adjust the temperature of the sensor. In one example, conditioning device 312 can be used to simulate different temperatures of operation during calibration of sensor 308 and thus allow a vehicle performing the calibration to obtain or generate calibration data that is suitable for various environmental conditions (e.g., temperatures) that are expected during operation of the vehicle. In another example, conditioning device 312 can be used to adjust a temperature of sensor 308 to a given temperature within a temperature range suitable for previously generated calibration data. For instance, device 300 could store calibration data that was collected when sensor 308 was at a particular temperature. Further, in this instance, device 300 may include or otherwise access an indication of a threshold range of temperatures in which the stored calibration data is suitable for mitigating measurement errors by sensor 308. Thus, in an example scenario, device 300 or a component thereof (e.g., controller 314) could detect (e.g., via temperature sensor 310) that a current temperature is outside the threshold range of temperatures, and responsively operate conditioning device 312 to adjust the temperature of sensor 308 to the given temperature within the threshold range of temperatures.

Controller 314 may include any combination of circuitry and/or computer logic executable to perform the functions of the various methods in the present disclosure. In one example, controller 314 can be implemented as one or more processors and data storage storing instructions executable by the one or more processors, similarly to the computer system 210 of vehicle 200. In another example, controller 314 can be implemented as digital and/or analog circuitry wired to perform the various functions of the present disclosure. Other implementations (e.g., combination of computer program logic and circuitry) are possible as well.

Figure 4A:
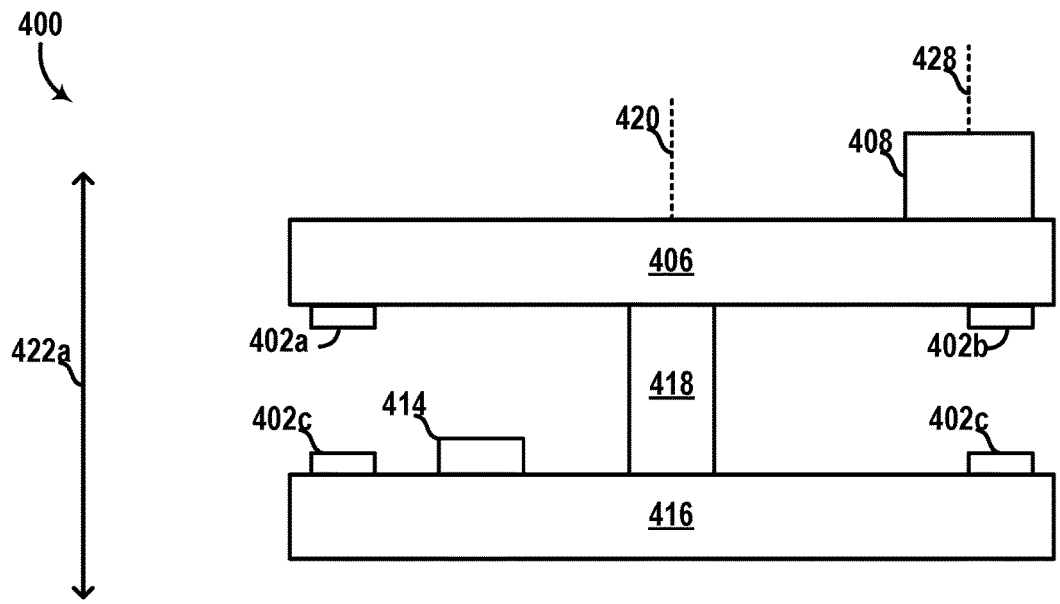
FIG. 4A illustrates a partial side view of a sensor unit, according to an example embodiment.

FIG. 4A illustrates a partial side-view of a sensor unit device 400, according to an example embodiment. Device 400 may be similar to device 300, and may be used with an electromechanical system such as vehicles 100 and 200, among other possibilities. For example, as shown, device 400 includes actuator 402, rotating platform 406 (e.g., "rotor"), sensor 408, and controller 414, that may be similar, respectively, to actuator 302, platform 306, sensor 308, and controller 314. Further, as shown, device 400 includes a base platform 416 (e.g., "stator") opposite to the rotating platform 406, and a core structure 418. Although not shown, in some examples, device 400 may include additional or fewer components than those shown. For example, device 400 can optionally include one or more of the components of vehicle 200 and/or device 300 (e.g., encoders, temperature sensors, conditioning devices, etc.).

In some examples, sensor 408 can be configured as a yaw sensor to provide an indication of a direction of motion of a vehicle (or rate of change thereof). By way of example, consider a scenario where device 400 is mounted to vehicle 100 such that axis 422a shown in FIG. 4A corresponds to or is parallel to yaw axis 114 of vehicle 100 shown in FIG. 1B. In this scenario, sensor 408 can be arranged such that a yaw axis of sensor 408 is substantially parallel to the yaw axis 422a of the vehicle. With this arrangement, sensor 408 can provide an output signal indicative of a yaw direction (or a change thereof) of sensor 408, which also corresponds to a yaw direction (or a change thereof) of the vehicle associated with axis 422a. Continuing with the scenario above, an initial yaw direction of sensor 408 may correspond to a direction that is perpendicular to axis 428 and pointing out of the page. In this scenario, if vehicle 100 rotates about axis 114 (i.e., axis 422a), then axis 428 of sensor 428 may experience a similar rotation, and thus the yaw direction of sensor 408 (yaw sensor) will change similarly to a change of the yaw direction of the vehicle. As a variation of this scenario, if axis 428 is aligned to correspond to axis 114 of the vehicle, then sensor 408 itself would rotate about axis 428 (and axis 114) in response to a rotation of the vehicle (e.g., vehicle makes a right turn or left turn), and thus the yaw direction of sensor 408 may also change similarly to the change to the yaw direction of the vehicle. In one implementation, sensor 408 may comprise a gyroscope, and axis 428 may correspond to a reference axis of the gyroscope. In this implementation, sensor 408 may provide a yaw rate measurement (e.g., a signal indicating a rate of rotation of the gyroscope about the reference yaw axis).

Alternatively or additionally, in other examples, sensor 408 can be configured as a pitch sensor (e.g., by aligning axis 428 with axis 116 of vehicle 100), or a roll sensor (e.g., by aligning axis 428 with axis 118 of vehicle 100).

Although not shown, in some examples, where sensor 408 is a yaw sensor, device 400 may also include a pitch sensor and/or a roll sensor mounted to platform 406 (e.g., rotor platform). With this arrangement, for instance, mounting the pitch and roll sensors on the same platform 406 as yaw sensor 408 can mitigate noise fluctuations caused by pitch and/or roll vibrations of platform 406 in scenarios where axis of rotation 420 does not remain perfectly aligned or parallel to yaw axis 422a (e.g., due to mechanical vibrations, shocks, other forces, a tilt of platform 406 relative to platform 416, etc.), among other possibilities.

In some examples, as shown, device 400 can be implemented as a rotary joint device that includes mounting platform 406 (e.g., rotor) that mounts sensor 408. Further, device 400 may include actuator 402 that rotates platform 406 relative to platform 416 (e.g., stator). For example, actuator 402 can be implemented as an axial flux motor that includes a plurality of magnets in a substantially circular arrangement, exemplified by magnets 402a and 402b, mounted on (rotor side) platform 406. Further, in this example, actuator 402 may include motor windings or coils 402c that are arranged to at least partially overlap magnets 402a and 402b of actuator 402. Thus, device 400 (e.g., via controller 414) can modulate an electrical current flowing through windings 402c to generate a modulated magnetic field that interacts with a magnetic field of magnets 402a and 402b to cause a rotation of platform 406 about an axis of rotation 420. In one implementation, platform 406 may remain at a predetermined distance (e.g., approximately 8-10 millimeters, etc.) to platform 416 in response to the relative rotation between the two platforms. However, other implementations of actuator 402 are possible as well, such as any of the implementations described for actuators 236 and/or 302, or any other actuator implementation. Further, the predetermined distance between platforms 406 and 416 may be any other distance.

In some examples, as shown, sensor 408 can be mounted to platform 406 such that the yaw axis 428 or other reference axis of sensor 408 is at an offset to the axis of rotation 420 of platform 406. With this arrangement, for instance, a center region of platform 406 can be used for mounting other circuitry such as a transformer core, communication circuitry for communication between platforms 406 and 416, and/or other circuitry that is more suitable for mounting near or at the center region of platform 406. However, in other examples, sensor 408 can be alternatively arranged at the center region such that reference axis 428 of sensor 408 corresponds to or overlaps axis of rotation 420 of platform 406.

Core 418 may comprise any solid structure (e.g., spinning needle, etc.) that facilitates maintaining a predetermined distance of separation between platforms 406 and 416. Alternatively or additionally, in some examples, core 418 may comprise a magnetic core (e.g., transformer core) that facilitates transmission of power from platform 416 to platform 406. For example, platform 406 may include transformer coils (not shown) arranged around core 418, and platform 416 may include corresponding transformer coils (not shown) arranged around core 418. In this example, device 400 (e.g., via controller 414) can cause an electrical current to flow through the transformer coils (not shown) of platform 416, and the induced electrical current in the opposite coils (not shown) of platform 406 can then be used to power sensor 408.

As noted above, in some scenarios, output from sensor 408 may be prone to various measurement errors including scale factor errors. A scale factor error is a type of measurement error that varies depending on the value or magnitude of the measurement indicated by a sensor. For instance, where sensor 408 comprises a gyroscope configured as a yaw sensor, the gyroscope may provide an output signal indicating a yaw rate of the gyroscope, and the indicated yaw rate may include a measurement error that increases (linearly or nonlinearly) as the measured yaw rate increases (e.g., a faster vehicle turning maneuver may lead to a higher scale factor error, etc.), due to the physical and/or mechanical properties of the gyroscope. Accordingly, device 400 may be configured to reduce such scale factor error by rotating platform 406 against the direction of rotation indicated by sensor 408. In one example, controller 414 may be configured to receive the output from sensor 408, and actively or dynamically operate actuator 402 to rotate platform 406 toward an opposite direction of the measured rotation from sensor 408. By doing so, for instance, device 400 can drive down the measured values from sensor 408 closer to a value of zero, and thus minimize the effect of scale factor errors associated with higher measured yaw rate values. In some instances, controller 414 may perform these rotations via a control loop feedback mechanism (e.g., proportional-intergral-derivative (PID) controller, etc.), and/or any other computer logic or analog digital circuitry.

Further, controller 414 can keep track of the actuated rotations of platform 406 (e.g., via an encoder), and can use the platform rotation history to deduce or estimate changes to the yaw direction of the vehicle. In one example, if the vehicle makes a right turn, which results in a right direction yaw rotation of sensor 408, then controller 414 may responsively rotate platform 406 in a left direction of rotation and at a substantially similar rate of rotation as the measured yaw rate from sensor 408. Thus, by keeping track of the rotation characteristics of platform 406, controller 414 can later deduce that the vehicle performed a right turn maneuver at an angular speed (or yaw rate) associated with the rate of rotation of platform 406.

In some scenarios, as noted above, the yaw rate measurement indicated by sensor 408 may be prone to another type of error, which may be referred to herein as a tilting error or an axis misalignment error. Referring back to FIG. 1B by way of example, consider a scenario where vehicle 100 includes device 400, and performs a right turn on a driving surface (not shown). In this scenario, vehicle 100 may rotate about yaw axis 114 in response to the change in the direction of motion of the vehicle. Ideally, vehicle 100 can use output from sensor 408 to accurately measure the change in the direction of motion of the vehicle. For instance, vehicle 100 can be configured as an autonomous vehicle and may thus rely on the measurements from sensor 408 to smoothly perform the right turn maneuver while remaining within a driving lane (not shown). However, in this scenario, the right turn maneuver may cause vehicle 100 to tilt toward the left side of vehicle 100 (e.g., rotate about roll axis 118) due to vehicle dynamics such as centripetal forces acting on the vehicle and/or a momentum of the vehicle. As a result, in this scenario, yaw axis 114 of vehicle 100 (and thus yaw axis 428 of sensor 408) may tilt by a tilting angle associated with the extent of the change in the roll orientation of the vehicle, thereby causing a tilting measurement error of the yaw rate measurement indicated by sensor 408. As variations of this scenario, the tilting of yaw axis 114 (and 428) can be additionally or alternatively due to any combination of mechanical vibrations of vehicle 100 (or device 400), vehicle 100 driving over an uneven driving surface, and/or vehicle 100 driving over a surface that is not parallel to the direction of motion of the vehicle (e.g., slanted road, etc.). As further variations of these scenario, the tilting of yaw axis 114 of vehicle 100 can be additionally or alternatively due to a rotation of vehicle 100 about pitch axis 116 (e.g., as a result of an acceleration or deceleration of vehicle 100).

Figure 4B:
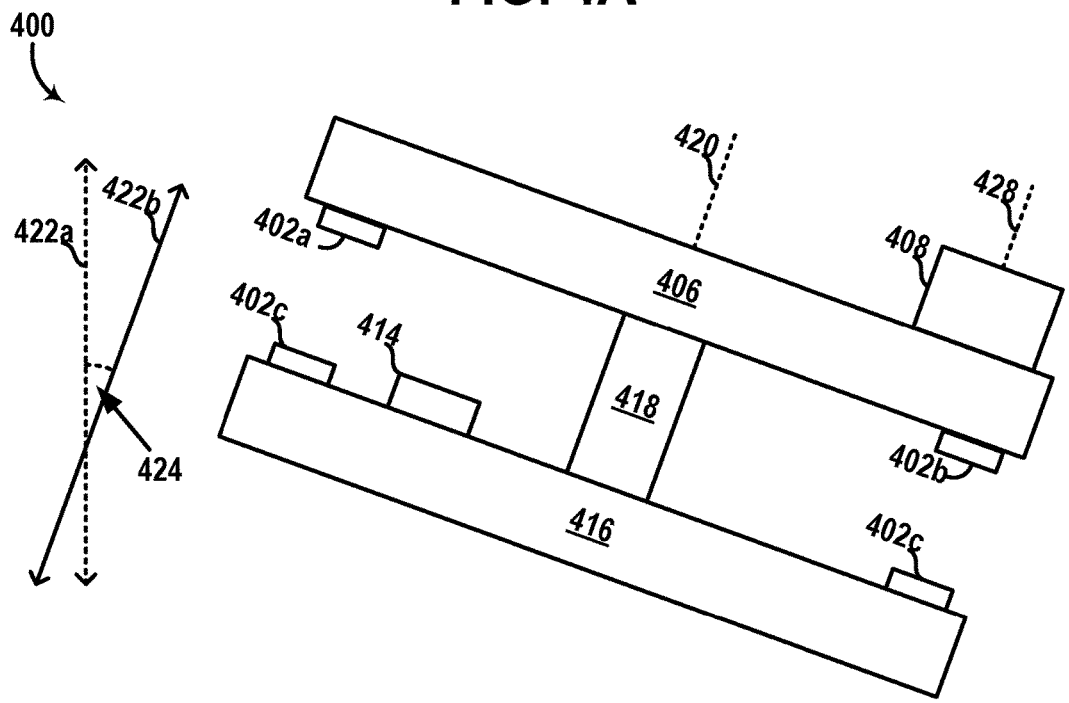
FIG. 4B illustrates the partial side view of the sensor unit of FIG. 4A in a tilted configuration.

To illustrate the scenarios above, for example, FIG. 4B shows another side view of sensor unit 400 in a tilted configuration. In FIG. 4B, yaw axis 422*b* may correspond to a tilted yaw axis (e.g., axis 114) of vehicle 100 according to any of the scenarios above. As shown, tilted yaw axis 422*b* is offset from the initial yaw axis 422*a* of FIG. 4A by a tilting angle 424 (θ). As a result, the observed yaw rate ($\omega_G$) measured by sensor 408 may indicate only a component of the rate of change to the direction of motion ($\omega_T$) of the vehicle (e.g., the change in direction of the vehicle about axis 422*a*), as expressed in Equation [1] below (where $\omega_S$ is the rate of actuated rotation of platform 406, which can be measured using an encoder for instance):

$$\omega_G = \omega_T \cos(\theta) + \omega_S \quad [1]$$

Accordingly, the present disclosure includes various implementations to mitigate the effect of the tilting measurement error described above.

In a first implementation, vehicle 100 may also include a roll sensor (and/or pitch sensor) to measure the roll rate (and/or pitch rate) of vehicle 100 similarly to the measurement of the yaw rate by sensor 408. For example, the roll sensor can be implemented as a gyroscope or other direction/IMU sensor that has a reference axis aligned with roll axis 118. Further, in this example, controller 414 can use output from the roll sensor (and/or the pitch sensor) to determine the tilting angle 424 (θ), and solve equation [1] to determine the rate of change to the direction of motion of the vehicle ($\omega_T$).

In a second implementation, controller 414 (or another computing device of vehicle 100) can calculate a component of a pitch rate measurement indicated by the pitch sensor, for instance, by solving an equation similar to equation [1] for the output of the pitch sensor. In this implementation, controller 414 can then sum the computed component of the direction of the vehicle from the pitch rate measurement and the computed component from the yaw rate measurement to determine the rate of change to the direction of the vehicle ($\omega_T$) about the initial yaw axis 422*a*.

In a third implementation, device 400 may also include a second actuator (not shown) that is configured to tilt sensor 408 against a direction of tilting angle 424 toward an alignment with the initial axis 422*a*. For instance, controller 414 can cause the second actuator to tilt platform 416, platform 406, and/or otherwise tilt sensor 408 about an axis of rotation (not shown) that points out of the page in the illustration of FIG. 4B, thereby reducing tilting angle 424 at least with respect to yaw axis 428 of sensor 408. In one example, the extent of tilting caused by the second actuator can be based on a determination of tilting angle 424 (e.g., based on output from a roll sensor and/or a pitch sensor). In another example, the extent of the tilting caused by the second actuator can be based on stored data (e.g., in data storage 214) that associates expected or predetermined tilting angles with vehicle motion characteristics such as speed of the vehicle during a turn, angular change of the direction of motion of the vehicle, etc. For instance, the stored data may include a map of previously measured or simulated vehicle banking angles relative to different types of driving maneuvers, etc.

In a fourth implementation, vehicle 100 may also include a roll sensor mounted on a rotating platform to rotate against a measured roll rotation of vehicle 100 (similarly to the rotation of platform 406 against a yaw rotation of vehicle 100). In this implementation, the rotating platform of the roll sensor can be mechanically coupled (e.g., via gears, mechanical arms, etc.) to device 400 (or sensor 408) to rotate device 400 against a roll rotation of the vehicle, thereby reducing tilting angle 424 (or at least a roll component of tilting angle 424). Additionally or alternatively, as a variation of this implementation, vehicle 100 may include a pitch sensor mounted on a rotating platform mechanically coupled (similarly to the roll sensor rotating platform) to sensor 408 to reduce a pitch component of tilting angle 424.

In a fifth implementation, vehicle 100 may include multiple yaw sensors mounted at different tilting offsets relative to axis 422a. In this implementation, controller 414 can then compute the change to the direction of motion of the vehicle based on one or more outputs from the multiple yaw sensors. For example, a first yaw sensor similar to sensor 408 can be mounted to the vehicle at a first tilting angle toward a right side of the vehicle (i.e., pre-tilted to have an initial roll offset relative to axis 422a), and a second yaw sensor (not shown) similar to sensor 408 can be mounted to the vehicle at a second tilting angle toward the left side of the vehicle (i.e., pre-tilted to have an opposite initial roll offset relative to axis 422a). In one example, controller 414 can combine the outputs from both yaw sensors to determine the change to the direction of motion of the vehicle. In another example, controller 414 can determine a direction of tilting angle 424 relative to axis 422a and then select one of the two yaw sensors that has a yaw offset opposite to the determined direction. For instance, if the vehicle is performing a right turn maneuver (i.e., banking to the left side), then controller 414 can select the first yaw sensor (which is tilted toward the right side), since the first yaw sensor may thus become more aligned with axis 422a due to the difference between the right side tilt of the sensor and the left side tilt caused by the vehicle turning maneuver. Whereas, for instance, if the vehicle is performing a left turn maneuver (i.e., banking to the right side), then controller 414 can select the second yaw sensor (which is tilted toward the left side) instead of the first yaw sensor.

As a variation of the fifth implementation, for example, the first tilting angle of the first yaw sensor may incorporate an initial pitch offset relative to axis 422a, and the second tilting angle of the second yaw sensor may incorporate an opposite initial pitch offset relative to axis 422a. For example, the first yaw sensor can be pre-tilted toward the front side of the vehicle, and the second yaw sensor can be pre-tilted toward the back side of the vehicle. Alternatively or additionally, for example, the first tilting angle and the second tilting angle can incorporate, respectively, a combination of initial roll offsets and pitch offsets relative to axis 422a.

It is noted that the shapes, dimensions, and positions shown in FIGS. 4A-4B for device 400 and the various components thereof are only for convenience in description. Thus, in some implementations, device 400 and/or components thereof can have other forms, shapes, arrangements, and/or dimensions as well. In one example, controller 414 can be alternatively mounted along another side of platform 416, mounted to platform 406, and/or implemented as a computing system outside device 400 (e.g., computing system 210, etc.) and/or outside a vehicle that includes device 400 (e.g., remote server, etc.). In another example, the functions described above for controller 414 can be alternatively performed by multiple controllers, processors, and/or physical circuit logic physically distributed in multiple devices.

IV. Example Methods and Computer-Readable Media

Figure 5:
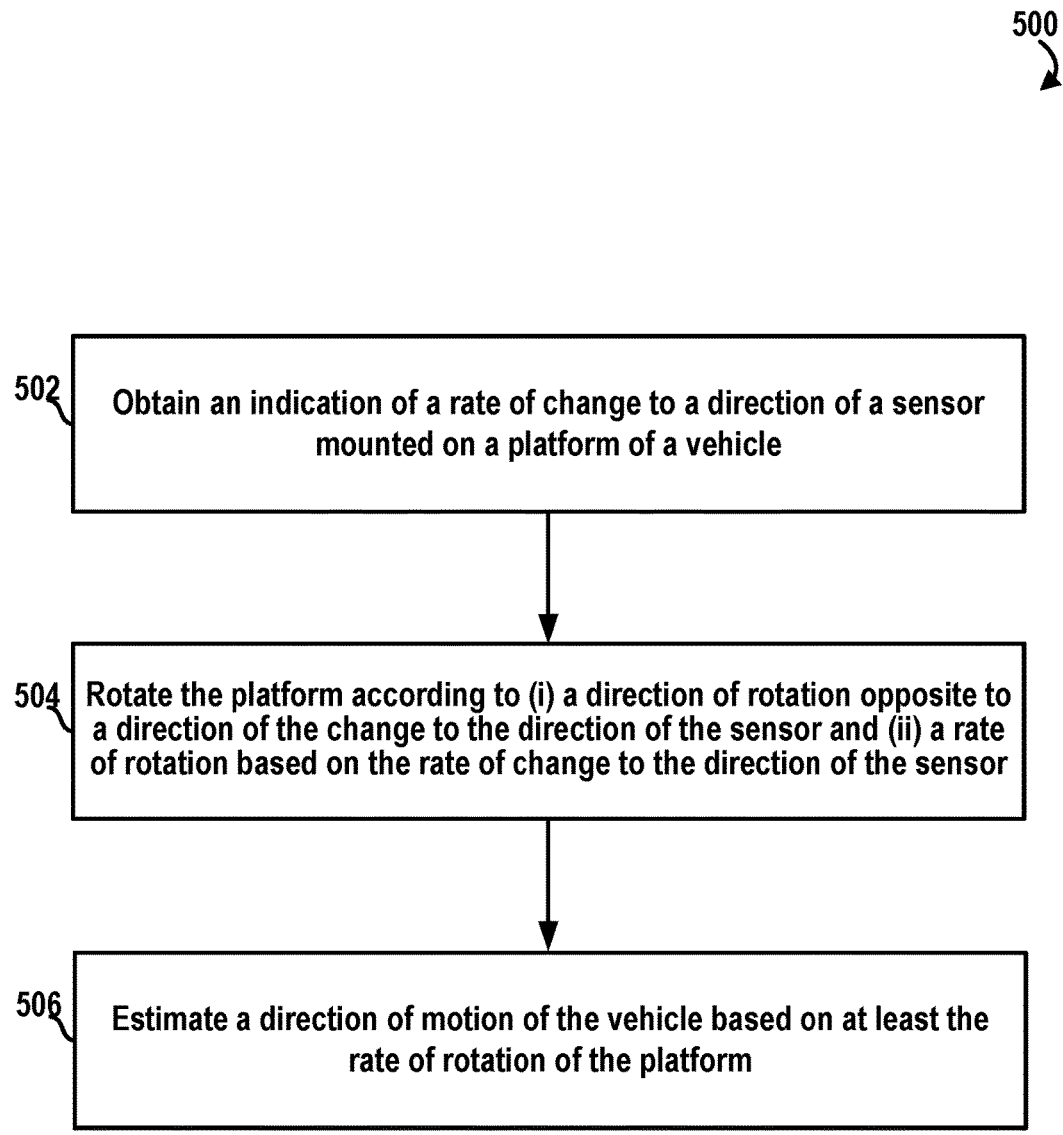
FIG. 5 is a flowchart of a method, according to an example embodiment.

FIG. 5 is a flowchart of a method 500, according to an example embodiment. Method 500 shown in FIG. 5 presents an embodiment of a method that could be used with any of the vehicles 100, 200, and/or the devices 300, 400, for example. Method 500 may include one or more operations, functions, or actions as illustrated by one or more of blocks 502-506. Although the blocks are illustrated in a sequential order, these blocks may in some instances be performed in parallel, and/or in a different order than those described herein. Also, the various blocks may be combined into fewer blocks, divided into additional blocks, and/or removed based upon the desired implementation.

In addition, for method 500 and other processes and methods disclosed herein, the flowchart shows functionality and operation of one possible implementation of present embodiments. In this regard, each block may represent a module, a segment, a portion of a manufacturing or operation process, or a portion of program code, which includes one or more instructions executable by a processor for implementing specific logical functions or steps in the process. The program code may be stored on any type of computer readable medium, for example, such as a storage device including a disk or hard drive. The computer readable medium may include non-transitory computer readable medium, for example, such as computer-readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, for example, or a tangible storage device.

In addition, for method 500 and other processes and methods disclosed herein, each block in FIG. 5 may represent circuitry that is wired to perform the specific logical functions in the process.

At block 502, method 500 involves obtaining an indication of a rate of change to a direction of a sensor mounted on a platform of a vehicle. In a first example, a controller of a sensor unit (e.g., controller 314) can receive an indication of a yaw rate of rotation of a yaw sensor (e.g., sensor 308) mounted on the platform (e.g., platform 306). In a second example, the controller can be implemented as a computing system of the vehicle (e.g., computing system 210) that provides instructions and/or control signals to operate the sensor and obtain the indication at block 502. In a third example, the computing system of the vehicle can obtain the indication from data storage (e.g., data storage 214) storing a stream of data output by the sensor. In a fourth example, a remote computing system (e.g., server) can obtain the indication via a wireless connection with the vehicle (e.g., via wireless communication system 252).

At block 504, method 500 involves rotating the platform according to (i) a direction of rotation opposite to a direction of the change to the direction of the sensor and (ii) a rate of rotation based on the rate of change to the direction of the sensor. For example, a controller (e.g., controller 314) can process the received indication of the rate of rotation of the sensor, and then rotate the platform against the measured rate indicated by the sensor to reduce the magnitude or value of (subsequent) rate measurements by the sensor. As a result, for instance, the controller can drive rate measurements by the sensor toward a value of zero or toward another constant/target value, thereby reducing the effect of scale factor errors, in line with the discussion above.

In some examples, method 500 may also involve determining a target value for the yaw rate measurement indicated by the sensor. In these examples, rotating the platform at block 504 may also be based on the determined target value. For instance, the sensor may be associated with a bias or offset yaw rate measurement (e.g., bias error, etc.), other than a yaw rate measurement value of zero, at which scale factor error(s) are minimized. By way of example, the sensor may output a yaw rate measurement other than zero even if the sensor is stationary (e.g., actual yaw direction of sensor unchanged) due to the sensor being associated with a bias error. Accordingly, in these examples, method 500 may involve detecting that the vehicle is stationary (e.g., using a GPS measurement, accelerometer measurements, other sensor measurements, tracking wheel motion, etc.), preventing rotation of the platform based on at least the detection, receiving an indication of a bias yaw rate measurement from the sensor during the prevention of the rotation of the platform, and determining the target value based on the bias yaw rate measurement. For instance, at block 504, the vehicle can rotate the platform at a rate of rotation that is also based on the determined target value (i.e., toward a bias rate of rotation that corresponds to the bias yaw rate measurement of a stationary sensor). Through this process, for instance, method 500 can account for bias measurement errors as well as scale factor errors. Further, for instance, method 500 can drive output from the sensor toward the bias yaw rate measurement value (e.g., stationary sensor output bias, etc.) which may be associated with lower scale factor error(s) than a yaw rate measurement value of zero.

In some examples, method 500 may also involve adjusting a tilting angle of the platform. Referring back to FIG. 4B by way of example, device 400 may include an additional actuator (not shown) to tilt or rotate sensor 408 against a direction of tilting angle 424, thereby reducing tilting angle 424 at least with respect to yaw axis 428 of sensor 408. In these examples, method 500 can optionally involve receiving an indication of an expected change to the direction of motion of the vehicle based on a predetermined navigation path of the vehicle, and adjusting the tilting angle of the platform accordingly. For example, navigation system 248 of vehicle 200 may anticipate an expected maneuver of the vehicle (e.g., right turn, left turn, etc.), and provide an indication thereof to computing system 210 or another controller operating an actuator that rotates the platform. In this example, computing system 210 can then estimate, based on the predetermined navigation path, an expected tilt (e.g., banking angle, etc.) of the vehicle and responsively or proactively tilt the (yaw) sensor of block 502 to reduce tilting or axis misalignment errors. In some instances, computing system 210 can estimate the expected tilt based on previously stored (e.g., in data storage 214) banking angles measured or simulated for different navigation maneuver characteristics (e.g., speed of turn, angle of turn, etc.).

At block 506, method 500 involves estimating a direction of motion of the vehicle based on at least the rate of rotation of the platform. For example, a system of method 500 can keep track of the rotation of the platform and use the history of rotations to identify changes to the driving path of the vehicle in an environment, in line with the discussion above.

In some examples, method 500 may also involve estimating the direction of the vehicle based also on output from a pitch sensor. In one instance, a system can determine a component of the direction of the vehicle and/or a tilting angle of the vehicle due to a pitch rotation or a roll rotation of the vehicle, and compute the change to the direction of the vehicle accordingly, in line with the discussion of equation [1] in FIG. 4B. In another instance, the system can tilt the (yaw) sensor of block 502 to reduce a tilting angle caused by a pitch rotation or roll rotation of the vehicle. Further, in some examples, method 500 may also involve estimating the direction based on the output from the pitch sensor in response to detecting that a roll orientation of the vehicle is at a threshold to a given roll orientation. For instance, vehicle 100 may include a roll sensor that measures a roll orientation of vehicle 100 about roll axis 118. Vehicle 100 may thus begin using pitch sensor outputs to determine a component of the change to the direction of the vehicle when the vehicle performs at least a threshold roll rotation about axis 118.

As noted above, some example implementations herein allow improved sensor calibration and/or recalibration by using the sensor platform (e.g., platform 406) to calibrate the sensor without unmounting the sensor. Accordingly, in some examples, method 500 also involves storing calibration data for the sensor of block 502. For example, vehicle 200 can store the calibration data in data storage 214 as a mapping between predetermined or given rates of rotation of the platform and previously measured rates indicated by the sensor.

Accordingly, in some examples, method 500 also involves enabling a calibration mode of the vehicle. For example, a system of method 500 may estimate the direction of motion of the vehicle at block 506 also based on the vehicle having an enabled operation mode (e.g., driving mode, etc.) other than the calibration mode. Further, in these examples, method 500 also involves rotating the platform according to a sequence of given or predetermined rates of rotation. For instance, the system may rotate the platform along a first direction at one, two, three, or more specific (predetermined) angular rates of rotation then along a second direction at one, two, or more specific (predetermined) angular rates, etc. Other example sequences are possible as well. Further, in these examples, method 500 also involves obtaining respective measurements indicated by the sensor for the given rates of rotation in the sequence, and generating calibration data that maps the given rates of rotation of the sequence to the respective measured rates indicated by the sensor. For example, the vehicle can store (or update previously stored) calibration data that maps the measured rates to the rotation rates of the sequence.

Further, in these examples, method 500 can optionally involve causing a conditioning device of the vehicle to adjust a temperature of the sensor (and/or a temperature of air surrounding the sensor) to a given temperature, and associating the generated calibration data with the given temperature. For example, controller 314 may operate conditioning device 312 to simulate various expected temperatures of operation of sensor 308, and then generate multiple sets of calibration data that map the sequence of rates of platform rotation to respective measurements for each temperature. Through this process, for instance, an example system may maintain accurate calibration data for various environmental conditions (e.g., temperatures) that may affect the operation of the sensor.

Further, in some examples, method 500 may also involve updating the stored calibration data in response to one or more triggers.

In a first example, the vehicle may include an input interface (e.g., touch screen 254, microphone 256, etc.) configured to receive user input for triggering the calibration process. Thus, in this example, method 500 may also involve updating the stored calibration data in response to receiving a request for calibrating the sensor via the input interface.

In a second example, the vehicle may monitor passage of time since a previous calibration of the sensor (e.g., to account for drift errors that occur due to passage of time). Thus, in this example, method 500 may also involve updating the stored calibration data based on at least passage of a given amount of time from a time of a previous update to the calibration data. For instance, the vehicle may alert a user that the calibration data is out of date upon passage of the given amount of time, or the vehicle may automatically initiate calibration (e.g., when the vehicle is parked or is in an operation mode other than a driving mode, etc.). The given amount of time can have any value depending on physical characteristics (e.g., drift properties) of the sensor, among other factors.

In a third example, the vehicle may monitor the temperature of the environment or the temperature of the sensor. For instance, the response of the sensor (and thus the calibration data) may be dependent on the operating temperature of the sensor. If the measured temperature exceeds a threshold to the temperature used for obtaining the stored calibration data, then the vehicle may trigger or otherwise alert a user to generate updated calibration data that is more suitable for the current measured temperature. Thus, in this example, method 500 may also involve updating the calibration data based on a temperature sensor (e.g., sensor 310) indicating a measured temperature that differs from a previously measured temperature associated with the stored calibration data by at least a threshold amount. The threshold amount can have any value depending on the physical characteristics (e.g., temperature sensitivity, etc.) of the sensor, among other factors.

In a fourth example, the vehicle may trigger the calibration process by monitoring the operation mode of the vehicle. For instance, the vehicle may trigger the calibration process during an operation mode where the vehicle is less likely to use the sensor, such as when the vehicle is parked or during initial startup or activation of the vehicle (e.g., when the vehicle is powered). Thus, in this example, method 500 may also involve updating the calibration data in response to at least activation of the vehicle (e.g., when controller 314 receives power, etc.). In some implementations, the vehicle can update the calibration data (e.g., perform the calibration in response to activation) based also on the vehicle remaining stationary during the calibration. However, in some scenarios, the vehicle may begin moving during the calibration process, and thus the previously stored calibration data may be more reliable than updated calibration data.

Accordingly, in some implementations, the vehicle can store initial calibration data that is collected prior to activation of the vehicle (e.g., while the vehicle is offline or stationary, prior to mounting the sensor to the vehicle, etc.). Upon activation, in this implementation, the vehicle could then perform a second shorter calibration process (e.g., using a shorter sequence of platform rotations, etc.). The vehicle can then compare second calibration data of the second calibration process with the initial calibration data to confirm that the initial calibration data is suitable for operating the sensor (e.g., second calibration data similar to initial calibration data, etc.). If the comparison indicates a mismatch, for instance, then the vehicle can repeat the second calibration process to account for a scenario where the vehicle begins moving during the second calibration process. If the comparison continues to indicate a mismatch, for instance, then the vehicle may alert a user (e.g., via input interface) that a complete calibration process is recommended while the vehicle is stationary to properly update the previously stored calibration data.

It should be understood that arrangements described herein are for purposes of example only. As such, those skilled in the art will appreciate that other arrangements and other elements (e.g. machines, interfaces, functions, orders, and groupings of functions, etc.) can be used instead, and some elements may be omitted altogether according to the desired results. Further, many of the elements that are described are functional entities that may be implemented as discrete or distributed components or in conjunction with other components, in any suitable combination and location, or other structural elements described as independent structures may be combined.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims, along with the full scope of equivalents to which such claims are entitled. It is also to be understood that the terminology used herein is for the purpose of describing particular embodiments only, and is not intended to be limiting.

What is claimed is:

1. A vehicle comprising:
   a platform;
   a yaw sensor mounted on the platform, wherein the yaw sensor provides an indication of a yaw rate of rotation of the yaw sensor;
   an actuator that rotates the platform;
   an encoder coupled to the platform; and
   a controller coupled to the yaw sensor and the actuator, wherein the controller:
      receives the indication of the yaw rate from the yaw sensor;
      causes the actuator to rotate the platform (i) along a direction of rotation opposite to a direction of the rotation of the yaw sensor and (ii) at a rate of rotation based on the yaw rate of the yaw sensor;
      receives, from the encoder, measurements of the rotation of the platform caused by the actuator; and
      estimates, based on at least the measurements of the rotation of the platform caused by the actuator, a direction of motion of the vehicle in an environment of the vehicle.

2. The vehicle of claim 1, further comprising:
a pitch sensor that provides output indicative of a pitch orientation of the vehicle about a pitch axis of the vehicle, wherein the controller estimates the direction of the vehicle based also on the output from the pitch sensor.

3. The vehicle of claim 2, further comprising:
a roll sensor that provides output indicative of a roll orientation of the vehicle about a roll axis of the vehicle, wherein estimating the direction of the vehicle based also on the output from the pitch sensor is in response to the roll orientation being at a threshold to a given roll orientation.

4. The vehicle of claim 1, further comprising:
a second actuator coupled to the platform to adjust a tilting angle of the platform, wherein the tilting angle corresponds to an offset to a yaw axis of the yaw sensor, the offset associated with a roll rotation or a pitch rotation of the vehicle.

5. The vehicle of claim 4, wherein the vehicle is an autonomous vehicle, wherein the controller receives an indication of an expected change to the direction of motion of the vehicle based on a predetermined navigation path of the vehicle, and wherein the controller causes the second actuator to adjust the tilting angle of the platform based on at least the received indication of the expected change to the direction of motion of the vehicle.

6. The vehicle of claim 4, further comprising a roll sensor that provides output indicative of a roll orientation of the vehicle about a roll axis, wherein the controller receives an indication of a change to the roll orientation of the vehicle from the roll sensor, and wherein the controller causes the second actuator to adjust the tilting angle of the platform based on at least the received indication of the change to the roll orientation of the vehicle.

7. The vehicle of claim 1, wherein the yaw sensor is a first yaw sensor, wherein the yaw rate is a first yaw rate, the vehicle further comprising:
a second yaw sensor that provides an indication of a second yaw rate of rotation of the second yaw sensor, wherein the first yaw sensor is mounted to the vehicle at a first tilting angle such that a first yaw axis of the first yaw sensor is at a first offset to a yaw axis of the vehicle, and wherein the second yaw sensor is mounted to the vehicle at a second tilting angle such that a second yaw axis of the second yaw sensor is at a second offset to the yaw axis of the vehicle.

8. The vehicle of claim 7, wherein the controller determines a direction of a change to the direction of motion of the vehicle,
wherein estimating the direction of motion of the vehicle based on at least the measurements of the rotation of the platform is based also on the determined direction corresponding to a direction of the first tilting angle, and
wherein the controller, based on the determined direction corresponding to a direction of the second tilting angle, estimates the direction of motion of the vehicle based on the second yaw rate of the second yaw sensor.

9. The vehicle of claim 1, wherein the encoder provides an indication of an orientation of the platform in response to the actuator causing the platform to rotate, wherein the controller determines a rate of rotation of the platform based on output from the encoder, and wherein the controller estimates the direction of motion of the vehicle based on the determined rate of rotation.

10. The vehicle of claim 1, further comprising:
data storage storing calibration data for the yaw sensor, wherein the calibration data is indicative of a mapping between given rates of rotation of the platform and previously measured yaw rates indicated by the yaw sensor, and wherein the controller estimates the direction of motion of the vehicle based also on the calibration data.

11. The vehicle of claim 10, further comprising an input interface, wherein the controller updates the calibration data in response to receiving a request for calibrating the yaw sensor via the input interface.

12. The vehicle of claim 10, further comprising a temperature sensor, wherein the calibration data includes an indication of a previously measured temperature indicated by the temperature sensor at a time of receipt of the previously measured yaw rates of the calibration data, and wherein the controller updates the calibration data based on at least the temperature sensor indicating a measured temperature that differs from the previously measured temperature by at least a threshold amount.

13. The vehicle of claim 10, wherein the controller updates the calibration data based on at least passage of a given amount of time from a time of a previous update to the calibration data.

14. The vehicle of claim 10, wherein the controller updates the calibration data in response to activation of the vehicle, and wherein activation of the vehicle causes the controller to receive power.

15. A method comprising:
receiving, from a yaw sensor mounted on a platform of a vehicle, an indication of a yaw rate of rotation of the yaw sensor;
rotating the platform according to (i) a direction of rotation opposite to a direction of the rotation of the yaw sensor and (ii) a rate of rotation based on the yaw rate of the yaw sensor;
receiving, from an encoder coupled to the platform, measurements of the rotation of the platform; and
estimating a direction of the vehicle in an environment based on at least the measurements of the rotation of the platform received from the encoder.

16. The method of claim 15, further comprising:
determining that the vehicle is tilting about a roll axis of the vehicle or a pitch axis of the vehicle, wherein the tilting of the vehicle causes a tilt offset to a yaw axis of the yaw sensor; and
responsively actuating the platform to reduce the tilt offset.

17. A method comprising:
obtaining sensor data collected using a sensor mounted on a platform of a vehicle, wherein the sensor data includes an indication of a rate of change to a direction of the sensor about a reference axis of the sensor;
rotating the platform such that (i) a direction of the rotation is opposite to a direction of the change to the direction of the sensor and (ii) a rate of the rotation is based on the rate of change to the direction of the sensor;
receiving, from an encoder coupled to the platform, measurements of the rotation of the platform; and
based on at least the measurements of the rotation of the platform received from the encoder, estimating a direction of the vehicle in an environment of the vehicle.

18. The method of claim 17, further comprising:
accessing stored calibration data associated with the sensor, wherein the stored calibration data maps given rates of rotation of the platform to previously measured rates of change to the direction of the sensor, and wherein estimating the direction of the vehicle is also based on the stored calibration data.

19. The method of claim 17, further comprising:

enabling a calibration mode of the vehicle, wherein estimating the direction of the vehicle is based also on the vehicle having an enabled operation mode other than the calibration mode;

based on at least the calibration mode being enabled, rotating the platform according to a sequence of given rates of rotation;

for the given rates of rotation in the sequence, obtaining respective measurements indicated by the sensor; and generating calibration data that maps the given rates of rotation of the platform to the respective measured rates indicated by the sensor.

20. The method of claim 19, further comprising:

based on the calibration mode being enabled, causing a conditioning device of the vehicle to adjust a temperature of the sensor to a given temperature; and associating the generated calibration data with the given temperature.

\* \* \* \* \*